US 11,813,982 B1

(12) United States Patent
Weston et al.

(10) Patent No.: US 11,813,982 B1
(45) Date of Patent: Nov. 14, 2023

(54) VEHICLE SOUND EMULATION

(71) Applicant: Ford Global Technologies, LLC, Dearborn, MI (US)

(72) Inventors: Keith Weston, Canton, MI (US); Andrew Denis Lewandowski, Sterling Heights, MI (US); Jordan Barrett, Milford, MI (US); Jennifer Bloedow, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1 day.

(21) Appl. No.: 17/863,441

(22) Filed: Jul. 13, 2022

(51) Int. Cl.
*B60Q 5/00* (2006.01)
*B60W 30/095* (2012.01)

(52) U.S. Cl.
CPC ......... *B60Q 5/008* (2013.01); *B60W 30/0953* (2013.01); *B60W 2554/4041* (2020.02); *B60W 2556/10* (2020.02)

(58) Field of Classification Search
CPC .............. B60Q 5/008; B60W 30/0953; B60W 2554/4041; B60W 2556/10
See application file for complete search history.

(56) References Cited

U.S. PATENT DOCUMENTS

| | | | |
|---|---|---|---|
| 6,032,097 A | 2/2000 | Iihoshi et al. | |
| 8,217,767 B2 | 7/2012 | Nakayama | |
| 8,537,030 B2 | 9/2013 | Perkins | |
| 9,522,632 B2 | 12/2016 | Kim | |
| 9,815,404 B2 | 11/2017 | Peachey et al. | |
| 10,489,994 B2 | 11/2019 | Dudar | |
| 10,629,224 B1 | 4/2020 | Alonzo, III | |
| 2009/0066499 A1 | 3/2009 | Bai et al. | |
| 2011/0010269 A1 | 1/2011 | Ballard | |
| 2011/0093149 A1* | 4/2011 | Tanaka | B60W 50/0098 903/902 |
| 2012/0179280 A1 | 7/2012 | Faye | |
| 2014/0056438 A1 | 2/2014 | Baalu et al. | |
| 2015/0139442 A1 | 5/2015 | Kreifeldt et al. | |
| 2015/0199955 A1 | 7/2015 | Draganic | |
| 2015/0203023 A1 | 7/2015 | Marti et al. | |
| 2015/0268665 A1 | 9/2015 | Ludwick et al. | |
| 2016/0042731 A1 | 2/2016 | Chang | |
| 2016/0152183 A1 | 6/2016 | Kim | |

(Continued)

FOREIGN PATENT DOCUMENTS

| | | |
|---|---|---|
| DE | 102013107738 A1 | 1/2015 |
| JP | 201256400 A | 3/2012 |

(Continued)

OTHER PUBLICATIONS

Hawkins, "Electric cars are now required to make noise at low speeds so they don't sneak up and kill us", The Verge, Nov. 16, 2016.

*Primary Examiner* — Daryl C Pope
(74) *Attorney, Agent, or Firm* — Frank Lollo; Bejin Bieneman PLC (57) ABSTRACT

A target vehicle can be identified for sound recording. A microphone on the host vehicle is activated to record sounds emanating from the target vehicle. A host vehicle assist feature is operated to maintain a sound recording proximity to the target vehicle. Then the sounds emanating from the target vehicle are recorded while the host vehicle is within the sound recording proximity of the target vehicle.

20 Claims, 5 Drawing Sheets

(56) References Cited

U.S. PATENT DOCUMENTS

| | | |
|---|---|---|
| 2016/0359741 A1 | 12/2016 | Cooper et al. |
| 2017/0154618 A1 | 6/2017 | Beckman et al. |
| 2017/0210394 A1 | 7/2017 | Yamada et al. |
| 2017/0215031 A1 | 7/2017 | Harding et al. |
| 2018/0082591 A1 | 3/2018 | Pandy |
| 2018/0137697 A1 | 5/2018 | Dudar |
| 2019/0084565 A1 | 3/2019 | Dudar |
| 2019/0188494 A1 | 6/2019 | Sawa et al. |
| 2021/0053487 A1 | 2/2021 | Vangelov et al. |

FOREIGN PATENT DOCUMENTS

| | | |
|---|---|---|
| KR | 1020130055836 A | 5/2013 |
| WO | 2013118250 A1 | 8/2013 |
| WO | 2015167192 A1 | 11/2015 |

\* cited by examiner

VEHICLE SOUND EMULATION

BACKGROUND

Electric vehicles, i.e., ground vehicles configured for propulsion by one or more electric motors, are now widely used and may become even more so in the years to come. Some electric vehicles are referred to as hybrid electric vehicles because they are configured for propulsion both by an electric motor and by an internal combustion engine (ICE). Other electric vehicles lack an ICE and are configured for propulsion only by an electric motor or motors, and may be referred to as battery electric vehicles (BEVs).

DESCRIPTION

Introduction

Figure 1:
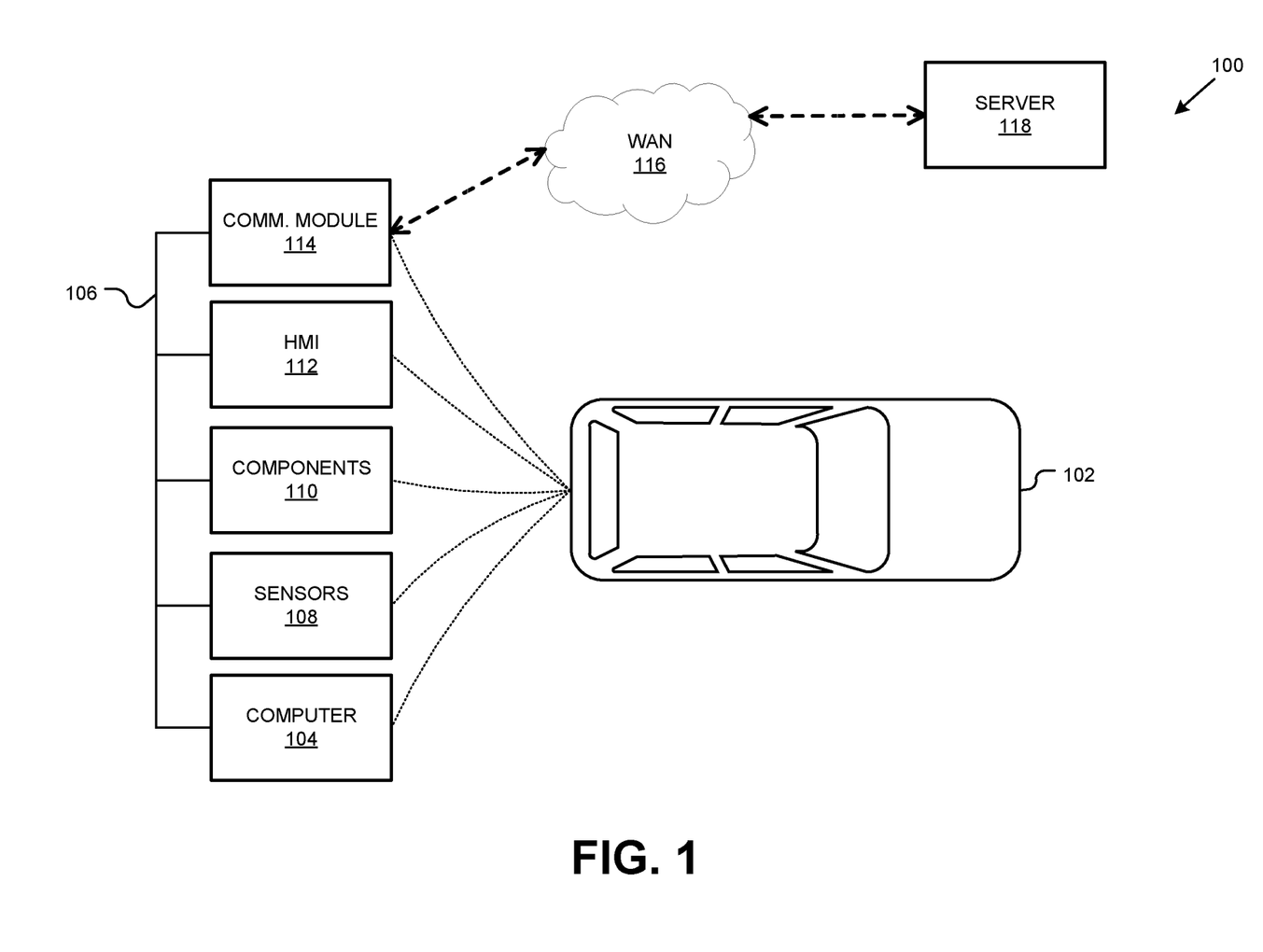
FIG. 1 is a block diagram of a vehicle sound capture and emulation system.
Figure 2A:
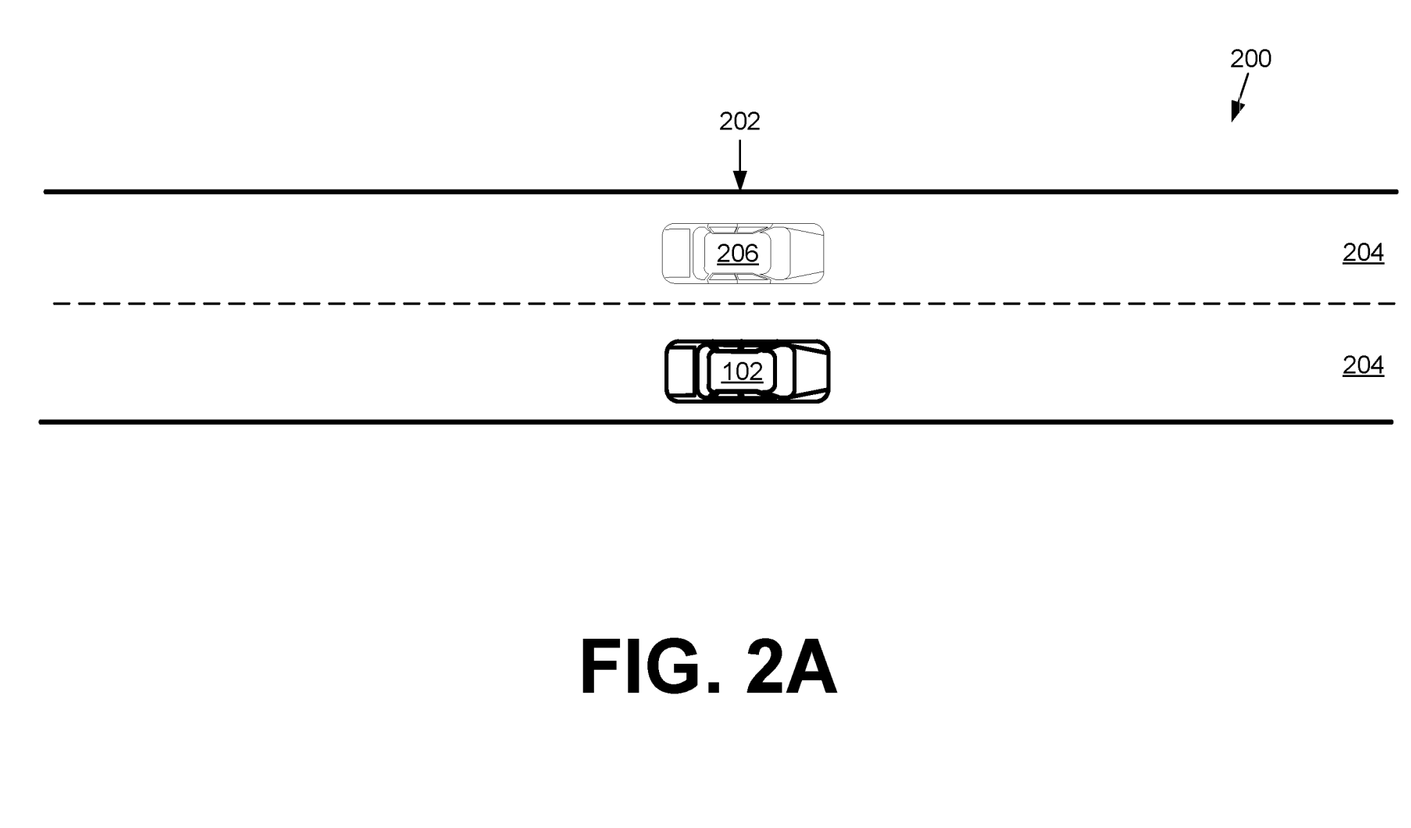
FIGS. 2A and 2B are, respectively, diagrams an example traffic scenes including a host vehicle and a target vehicle.
Figure 2B:
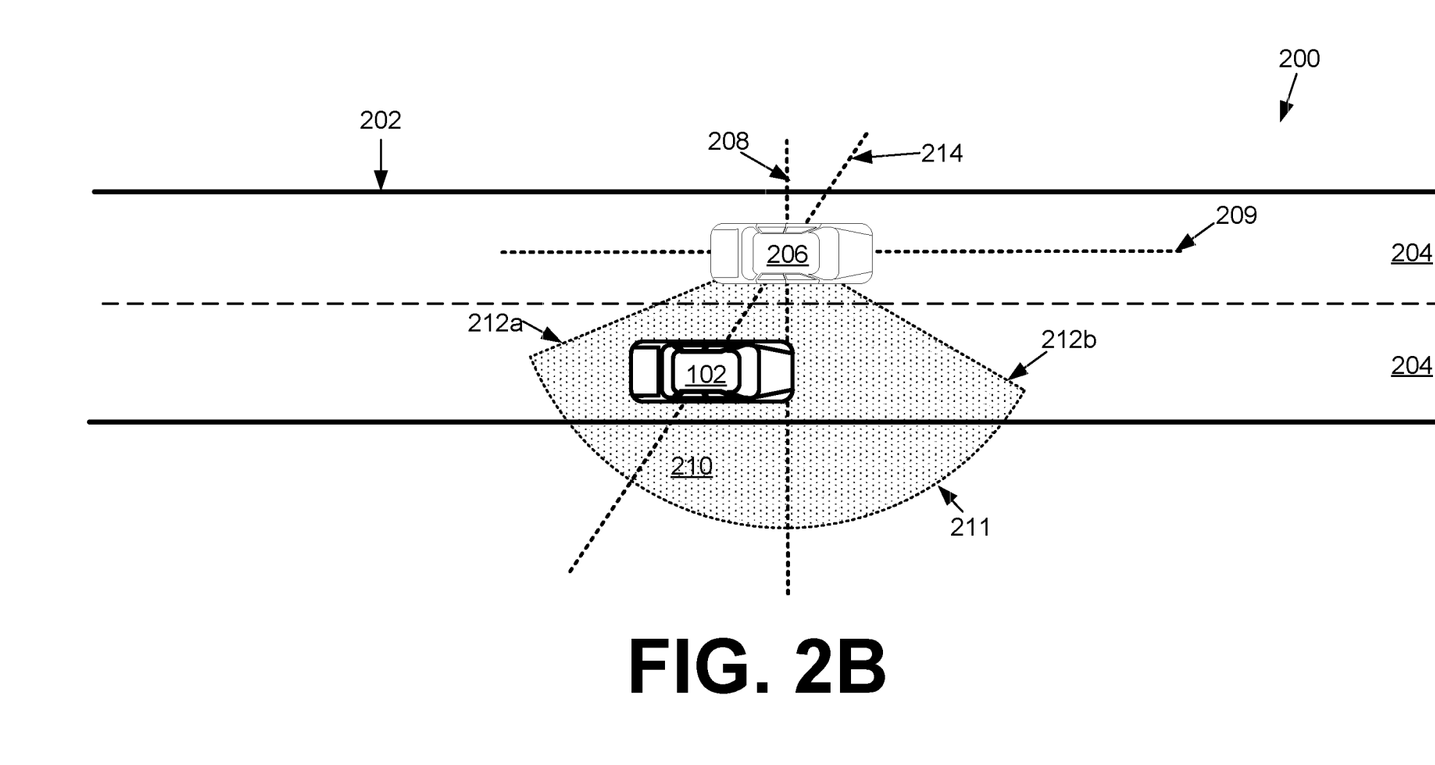

Referring to FIGS. 1 and 2, the present disclosure provides for a first or "host" vehicle 102 to obtain sounds naturally occurring from a second or "target" vehicle 206. The host vehicle 102 can then augment its own natural sounds by outputting stored sounds based on the sounds obtained from the other vehicles, and/or the first vehicle can provide sounds recorded from a target or vehicles to be output by yet other vehicles. Advantageously, the first vehicle can be operated to maintain a sound recording proximity area 210 with a target vehicle 206, i.e., a vehicle from which sound is to be recorded. The sound recording proximity area 210 is a distance and/or relative position of the host vehicle 102 with respect to the target vehicle 206 defined for recording the sounds. While within the sound recording proximity area 210, the vehicle computer 104 can receive and store sounds emanating from the target vehicle 206. The host vehicle 102 can then use the sounds during its own subsequent operation, and/or can upload the sounds to a remote server 118. The remote server 118 can in turn process the sounds and/or provide them to the host vehicle 102 for playback and/or to yet further vehicles. For example, a battery electric vehicle could play back sound recorded from an internal combustion engine vehicle, for example.

Accordingly, included in the present disclosure is a system for a host vehicle, comprising computer that includes a processor and a memory, The memory of the computer stores instructions executable by the processor including instructions to identify a target vehicle for sound recording; activate a microphone on the host vehicle to record sounds emanating from the target vehicle; operate a host vehicle assist feature to maintain a sound recording proximity to the target vehicle; and receive the sounds emanating from the target vehicle while the host vehicle is within the sound recording proximity of the target vehicle.

Operating the host vehicle assist feature can include instructions to operate one or more of propulsion, steering, or braking of the host vehicle.

The sound recording proximity can specify a distance of the host vehicle from the target vehicle. The specified by the sound recording proximity can be in a range of a maximum distance for the sound recording proximity and a minimum distance for the sound recording proximity. The sound recording proximity can specify a position of the host vehicle relative to the target vehicle. The sound recording proximity can be adjusted based on host vehicle sensor data and/or host vehicle operating data.

The target vehicle for sound recording can be identified based on a user input and/or host vehicle sensor data.

The host vehicle operating data can be stored at respective times when the sounds emanating from the target vehicle are recorded, wherein the host vehicle operating data includes at least one of torque demands, accelerations, and speeds, in the host vehicle.

The recorded sounds can be uploaded to a remote server. The sounds can be uploaded with host vehicle operating data stored at times associated with the recorded sounds. The remote server can store synthetic sounds based on the host vehicle operating data and the recorded sounds. The remote server can be configured to provide sound data to a third vehicle based on the recorded sounds of the target vehicle received from the host vehicle. The remote server can be configured to provide operating parameters to the third vehicle along with the sound data based on the recorded sounds of the target vehicle and the host vehicle operating data.

A method comprises identifying a target vehicle for sound recording; activating a microphone on the host vehicle to record sounds emanating from the target vehicle; operating a host vehicle assist feature to maintain a sound recording proximity to the target vehicle; and receiving the sounds emanating from the target vehicle while the host vehicle is within the sound recording proximity of the target vehicle.

The sound recording proximity can specify a distance of the host vehicle from the target vehicle. The specified by the sound recording proximity can be in a range of a maximum distance for the sound recording proximity and a minimum distance for the sound recording proximity. The sound recording proximity can specify a position of the host vehicle relative to the target vehicle. The sound recording proximity can be adjusted based on host vehicle sensor data and/or host vehicle operating data.

The target vehicle for sound recording can be identified based on a user input and/or host vehicle sensor data.

The host vehicle operating data can be stored at respective times when the sounds emanating from the target vehicle are recorded, wherein the host vehicle operating data includes at least one of torque demands, accelerations, and speeds, in the host vehicle.

The recorded sounds can be uploaded to a remote server. The sounds can be uploaded with host vehicle operating data stored at times associated with the recorded sounds. The remote server can store synthetic sounds based on the host vehicle operating data and the recorded sounds. The remote server can be configured to provide sound data to a third vehicle based on the recorded sounds of the target vehicle received from the host vehicle. The remote server can be configured to provide operating parameters to the third vehicle along with the sound data based on the recorded sounds of the target vehicle and the host vehicle operating data.

System Elements

As seen in FIG. 1, a vehicle sound capture and emulation system 100 includes a host vehicle 102 that in turn includes a computer 104 that is communicatively coupled via a communication network, such as a vehicle network 106, with various elements including sensors 108, components 110 such as steering, propulsion, and braking, a human machine interface (HMI), and a communication module 114.

The vehicle computer 104 (and also a remote server 118 discussed below) includes a processor and a memory. Further, the vehicle computer 104 could include a plurality of computers 104 in the vehicle, e.g., a plurality of ECUs or the like, operating together to perform operations ascribed herein to the vehicle computer 104. A memory of a computer 104 such as those described herein includes one or more forms of computer 104 readable media, and stores instructions executable by the vehicle computer 104 for performing various operations, including as disclosed herein. For example, a vehicle computer 104 can be a generic computer 104 with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor 108 data and/or communicating the sensor 108 data. In another example, a vehicle computer 104 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 104.

The memory can be of any type, e.g., hard disk drives, solid state drives, servers 118, or any volatile or non-volatile media. The memory can store the collected data sent from the sensors 108. The memory can be a separate device from the computer 104, and the computer 104 can retrieve information stored by the memory via a communication network in the vehicle such as the vehicle network 106, e.g., over a CAN bus, a wireless network, etc. Alternatively or additionally, the memory can be part of the computer 104, e.g., as a memory of the computer 104.

The computer 104 may include programming to operate one or more components 110 such as vehicle brakes, propulsion (e.g., one or more of an internal combustion engine, electric motor, hybrid engine, etc.), steering, climate control, interior and/or exterior lights, etc., as well as to determine whether and when the computer 104, as opposed to a human operator, is to control such operations. Additionally, the computer 104 may be programmed to determine whether and when a human operator is to control such operations. The computer 104 may include or be communicatively coupled to, e.g., via a vehicle network 106 such as a communications bus as described further below, more than one processor, e.g., included in components 110 such as sensors 108, electronic control units (ECUs) or the like included in the vehicle for monitoring and/or controlling various vehicle components, e.g., a powertrain controller, a brake controller, a steering controller, etc.

The computer 104 is generally arranged for communications on a vehicle network 106 that can include a communications bus in the vehicle such as a controller area network CAN or the like, and/or other wired and/or wireless mechanisms. The vehicle network 106 is a communications network via which messages can be exchanged between various devices, e.g., sensors 108, components 110, computer 104(s), etc. in vehicle. The computer 104 can be generally programmed to send and/or receive, via vehicle network 106, messages to and/or from other devices in vehicle e.g., any or all of ECUs, sensors 108, actuators, components 110, communications module, a human machine interface (HMI), etc. For example, various component 110 subsystems (e.g., components 110 can be controlled by respective ECUs) and/or sensors 108 may provide data to the computer 104 via the vehicle network 106. Further, in cases in which computer 104 actually comprises a plurality of devices, the vehicle network 106 may be used for communications between devices represented as computer 104 in this disclosure. For example, vehicle network 106 can include a controller area network CAN in which messages are conveyed via a CAN bus, or a local interconnect network LIN in which messages are conveyed via a LIN bus. In some implementations, vehicle network 106 can include a network in which messages are conveyed using other wired communication technologies and/or wireless communication technologies e.g., Ethernet, WiFi, Bluetooth, etc. Additional examples of protocols that may be used for communications over vehicle network 106 in some implementations include, without limitation, Media Oriented System Transport MOST, Time-Triggered Protocol TTP, and FlexRay. In some implementations, vehicle network 106 can represent a combination of multiple networks, possibly of different types, that support communications among devices in vehicle. For example, vehicle network 106 can include a CAN in which some devices in vehicle communicate via a CAN bus, and a wired or wireless local area network in which some device in vehicle communicate according to Ethernet or Wi-Fi communication protocols.

The vehicle typically includes a variety of sensors 108. A sensor 108 is a device that can obtain one or more measurements of one or more physical phenomena. Some sensors 108 detect internal states of the vehicle, for example, wheel speed, wheel orientation, and engine and transmission variables. Some sensors 108 detect the position or orientation of the vehicle, for example, global positioning system GPS sensors 108; accelerometers such as piezo-electric or micro-electromechanical systems MEMS; gyroscopes such as rate, ring laser, or fiber-optic gyroscopes; inertial measurements units IMU; and magnetometers. Some sensors 108 detect the external world, for example, radar sensors 108, scanning laser range finders, light detection and ranging LIDAR devices, and image processing sensors 108 such as cameras. A LIDAR device detects distances to objects by emitting laser pulses and measuring the time of flight for the pulse to travel to the object and back. Some sensors 108 are communications devices, for example, vehicle-to-infrastructure V2I or vehicle-to-vehicle V2V devices. Sensor 108 operation can be affected by obstructions, e.g., dust, snow, insects, etc. Often, but not necessarily, a sensor 108 includes a digital-to-analog converter to converted sensed analog data to a digital signal that can be provided to a digital computer 104, e.g., via a network.

Sensors 108 can include a variety of devices, and can be disposed to sense and environment, provide data about a machine, etc., in a variety of ways. For example, a sensor 108 could be mounted to a stationary infrastructure element on, over, or near a road. Moreover, various controllers in a vehicle may operate as sensors 108 to provide data via the vehicle network 106 or bus, e.g., data relating to vehicle speed, acceleration, location, subsystem and/or component 110 status, etc. Further, other sensors 108, in or on a vehicle, stationary infrastructure element, etc., infrastructure could include cameras, short range radar, long range radar, LIDAR, and/or ultrasonic transducers, weight sensors 108, accelerometers, motion detectors, etc., i.e., sensors 108 to provide a variety of data. To provide just a few non-limiting examples, sensor 108 data could include data for determining a position of a component 110, a location of an object, a speed of an object, a type of an object, a slope of a roadway 202, a temperature, an presence or amount of moisture, a fuel level, a data rate, etc.

The computer 104 may include programming to command one or more actuators to operate one or more vehicle subsystems or components 110, such as vehicle brakes, propulsion, or steering. That is, the computer 104 may actuate control of acceleration in the vehicle by controlling one or more of an internal combustion engine, electric motor, hybrid engine, etc., and/or may actuate control of brakes, steering, climate control, interior and/or exterior lights, etc. The computer 104 may include or be communicatively coupled to, e.g., via a vehicle network 106, more than one processor, e.g., included in components 110 such as sensors 108, electronic control units (ECUs) or the like for monitoring and/or controlling various vehicle components, e.g., ECUs or the like such as a powertrain controller, a brake controller, a steering controller, etc.

The vehicle can include an HMI 112 (human-machine interface), e.g., one or more of a display, a touchscreen display, a microphone, a speaker, etc. The user can provide input to devices such as the computer 104 via the HMI 112. The HMI 112 can communicate with the computer 104 via the vehicle network 106, e.g., the HMI 112 can send a message including the user input provided via a touchscreen, microphone, a camera that captures a gesture, etc., to a computer 104, and/or can display output, e.g., via a screen, speaker, etc. Further, operations of the HMI 112 could be performed by a portable user device (not shown) such as a smart phone or the like in communication with the vehicle computer 104, e.g., via Bluetooth or the like.

The computer 104 may be configured for communicating via a vehicle to vehicle communication module 114 or interface with devices outside of the vehicle, e.g., through a wide area network 116 and/or vehicle to vehicle V2V, vehicle-to-infrastructure or everything V2X or vehicle-to-everything including cellular communications C-V2X wireless communications cellular, DSRC, etc. to another vehicle, to an infrastructure element typically via direct radio frequency communications and/or typically via the network a remote server 118. The module could include one or more mechanisms by which the computers 104 of vehicles may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth, IEEE 802.11, dedicated short range communications DSRC, cellular V2X CV2X, and the like.

A computer 104 can be programmed to communicate with one or more remote sites such as a remote server 118, via a wide area network 116. The wide area network 116 can include one or more mechanisms by which a vehicle computer 104 may communicate with, for example, a remote server 118. Accordingly, the network can include one or more of various wired or wireless communication mechanisms, including any desired combination of wired e.g., cable and fiber and/or wireless e.g., cellular, wireless, satellite, microwave, and radio frequency communication mechanisms and any desired network topology or topologies when multiple communication mechanisms are utilized. Exemplary communication networks include wireless communication networks e.g., using Bluetooth, Bluetooth Low Energy BLE, IEEE 802.11, vehicle-to-vehicle V2V or vehicle to everything V2X such as cellular V2X CV2X, Dedicated Short Range Communications DSRC, etc., local area networks and/or wide area networks 116, including the Internet, providing data communication services.

The server 118 may include one or more computing devices, e.g., having respective processors and memories and/or associated data stores, that are accessible via the wide area network 116.

Exemplary System Operations

Referring again to FIGS. 1, 2A, and 2B, the vehicle sound capture and emulation system 100 comprises a computer 104 in a host vehicle 102 that can be programmed to carry out operations described herein (i.e., the memory of the computer 104 stores instructions executable by the processor to carry out various operations such as described herein). For example, while the host vehicle 102 is operating on a roadway 202 included in the illustration of the traffic scene 200 of FIG. 2, the computer 104 can be programmed to identify a second vehicle 206 for sound recording. For example, a battery electric vehicle (BEV) could include the computer 104, which could receive an input to identify the target vehicle 206 for sound recording so that sounds from the target vehicle 206 can be recorded and then later played back during subsequent operation of the host vehicle 102. Accordingly, upon identifying the target vehicle 206, the host vehicle computer 104 can activate one or more microphone sensors 108 on the host vehicle 102 to record sounds emanating from the target vehicle 206. The host vehicle 102 computer 104 can then operate a host vehicle 102 assist feature to maintain a sound recording proximity area 210 to the target vehicle 206, i.e., a distance and/or relative position for recording the sounds. While the host vehicle 102 is within the sound recording proximity area 210 (FIG. 2B) of the target vehicle 206, the host vehicle computer 104 can receive the recorded sounds emanating from the target vehicle 206.

The target vehicle 206 may be identified by the vehicle computer 104 based on a variety of data, including based on a user input or host vehicle sensor 108 data. For example, the computer 104 could include programming to display the vehicle HMI 112 a representation of one or more second vehicles 206 detected around the host vehicle 102 via host vehicle sensors 108. A user could then provide input to select one of the second vehicles 206 as the target vehicle 206 for sound recording.

The host vehicle 102 assist feature can include operation of a component 110 or components 110 including one or more of propulsion, steering, or braking of the host vehicle 102. The host vehicle 102 assist feature can be an advanced driver assistance system (ADAS) or other driver assist technology (DAT), such as adaptive cruise control (ACC), steering control, and/or other features that may be offered in a vehicle, e.g., as part of a driver assistance system such as BlueCruise, offered by Ford Motor Company of Dearborn, Michigan. For example, the host vehicle 102 assist feature could include instructions to activate and operate in adaptive cruise control that controls host vehicle 102 speed based on a speed of immediately preceding target vehicle 206, i.e., a target vehicle 206 forward of the host vehicle 102 with no other vehicles in between. In another example, the host vehicle 102 assist feature could include in adaptive cruise control implementation in which the host vehicle 102 is alongside the target vehicle 206, e.g., as shown in FIG. 2, the host vehicle 102 and target vehicle 206 could be in adjacent lanes of travel of a roadway 202. In this scenario, a host vehicle 102 computer 104 could detect speeds and/or accelerations (including decelerations) of the target vehicle 206 and control the host vehicle 102 speed to match the target vehicle 206 speed. Yet further, the host vehicle 102 computer 104 could detect steering action by the target vehicle 206, e.g., target vehicle 206 turning to the left or right, and could implement steering control to match the target vehicle 206 steering. The word "match" in this context is not intended to suggest an exact match of operating data (steering angles, speeds, etc.) of the host vehicle 102 with the target vehicle 206, but rather that the host vehicle 102 bases its actions to approximate as best as possible actions of the target vehicle 206.

The host vehicle 102 assist feature can be implemented to establish and/or maintain a sound recording proximity, i.e., defined by an area 210, with the target vehicle 206. As illustrated in FIG. 2B, a sound recording proximity area 210 includes a predetermined distance of the host vehicle 102 from the target vehicle 206 at which a sound recording can be carried out, and/or may include minimum and/or maximum distances at which the sound recording can be carried out. The sound recording proximity area 210 may further include a relative position of the host vehicle 102 with respect to the target vehicle 206. A relative position in this context means that the distance from the host vehicle 102 to the target vehicle 206 is measured along a line that is at a specified angle (or within a range of angles) from an axis of the target vehicle 206, such as a longitudinal axis 209 or lateral axis 208. As further described below, a sound proximity area 210 could be determined in a vehicle computer 102 based on stored data from prior empirical testing.

In the example of FIG. 2B, the distance can be measured from a point on or in the target vehicle 206, e.g., a geometric center where a lateral center axis 208 intersects a longitudinal center axis 209, i.e., the distance defines an arc 211. The arc 211 could define a complete circle as the proximity area 210, but typically the proximity area 210 is bounded or limited by lines or edges 212a, 212b. The lengths of the edges 212a, 212b are defined by the specified distance mentioned above, and their orientation or position is defined by the angle mentioned above, in the illustrated example, angles with the lateral center axis 208. The respective edges 212a, 212b could be defined by a same or different angles with an axis of the target vehicle, in this example the lateral center axis 208. For example, a host vehicle 102, traveling in a first lane 204 adjacent to a second lane 204 in which a target vehicle 206 is traveling, may be able to obtain a usable sound recording at a position, i.e., where the distance defining the area 210 is greater, further behind the target vehicle 206 than could be obtained at a like position, i.e., where the distance defining the area 210 is less, ahead of the target vehicle 206. In this case, the angle defining the edge 212a could be greater than the angle defining the edge 212b.

For example, as seen in FIG. 2B, a line 214 can be defined through any suitable point on the vehicles 102, 206, such as through a center point of the target vehicle 206 and a center point of the host vehicle 102. An angle between the line 214 and an axis of the target vehicle 206 (the lateral axis 208 in the example of FIG. 2B) can then be used to determine the position of the host vehicle 102 with respect to the target vehicle 206, and whether the position of the host vehicle 102 is within the sound proximity area 210. That is, in this example, the position of the host vehicle 102, defined by a center point of the host vehicle 102, is within the sound proximity area 210 because the angle between the lateral axis 208 of the target vehicle 206 and the line 214 is less than the angle defining the edge 212a, and the distance of the host vehicle 102 from the target vehicle 206 is less than a distance that defines the arc 211.

The sound recording proximity area 210 can be determined based on host vehicle sensor 108 data and/or host vehicle operating data. The sound recording proximity area can vary based on data including a type of target vehicle 206, a type of host vehicle 102, a speed of the target vehicle 206 and/or host vehicle 102 system, weather conditions, and/or a type of roadway 202 on which the target vehicle 206 and host vehicle 102 are traveling. A vehicle type in the present context means a specification of indicia according to which a vehicle belongs to a class of vehicles, e.g., a vehicle type may be specified according to a vehicle manufacturer, model, and/or model year. The host vehicle 102 computer 104 can store a type of the host vehicle 102. A type of a target vehicle 206 could be provided via user input, e.g., to a vehicle HMI 112, and/or could be determined based on host vehicle 102 sensor 108 data, e.g., by applying image recognition techniques to an image of a target vehicle 206. Host vehicle 102 sensors 108 can provide data such as speed and acceleration data about a target vehicle 206, about weather conditions (e.g., presence or absence and/or a type of precipitation, ambient environment temperature, etc.), etc. Further, host vehicle 102 operating data means data about operation of host vehicle 102 components 110, i.e., data available on the vehicle network 106 specifying either control inputs (e.g., a commanded steering angle, torque demand, etc.) or vehicle states, i.e., physical values describing vehicle operation, e.g., a steering angle, a torque, etc. A type of roadway 202 means a specification of indicia according to which a roadway 202 belongs to a class of roadways 202, such as a surface type (e.g., asphalt, gravel, etc.), and a road type (interstate highway, restricted access road, two-way two-lane road, etc. Further, host vehicle 102 operating data available on the vehicle network 106, for example, can include a host vehicle 102 speed, steering angle, yaw rate, etc.

In one implementation, the vehicle computer 104 is provided with stored data, e.g., in a lookup table or the like, specifying a sound recording proximity area 210 for various values of sensor 108 data and operating data determined in the host vehicle 102 for respective types of target vehicles 206. The stored data for determining the sound recording proximity area 210 could be empirically determined, e.g., by operating a host vehicle 102 on a test track or other test environment, or on a roadway 202, to record sounds of respective types of target vehicles 206 at various distances and positions with respect to the target vehicles 206. This empirical data collection could further include varying weather conditions, types of roadways 202, vehicle speeds, etc. By analyzing such empirically collected data to determine when a quality of recorded sound is acceptable, stored data values for sound recording proximity area 210 could be determined.

The host vehicle 102 computer 104 can store host vehicle 102 operating data at respective times when the sounds emanating from the target vehicle 206 are recorded, wherein the host vehicle 102 operating data includes at least one of torque demands, accelerations, and speeds, in the host vehicle 102.

The computer 104 can upload the recorded sounds to a remote server 118, and may further include stored operating data, including times associated with the recorded sounds.

By "times associated with the recorded sounds" it is meant that a sound recording may include a series of time indexes or timestamps, and the operating data can likewise specify time indexes or timestamps so that for a point or segment in a sound recording, operating data stored during that point or segment of the sound recording can be identified. Further, the remote server 118 can perform filtering and/or store synthetic sounds based on the host vehicle 102

The remote server 118 can provide sound data to the host vehicle and/or one or more third vehicles based on the recorded sounds of the target vehicle received from the host vehicle 102. For example, a sound recording can be provided according to a known audio format, e.g., WAV, which could include time indices or timestamps such as just mentioned. The sound recording could be provided along with operating parameters specified for respective timestamps in the sound data, i.e., operating data from the host vehicle 102 such as a speed, acceleration, propulsion torque demands, etc., at respective timestamps, so that the host vehicle 102 and/or third vehicle using the sound data could emulate the target vehicle 206 sound, e.g., could play sound via external speakers emulating sounds of the recorded target vehicle 206 and representing a speed, acceleration, torque demand, etc., during operation of the host vehicle 102 or third party vehicle.

Example Processes

Figure 3:
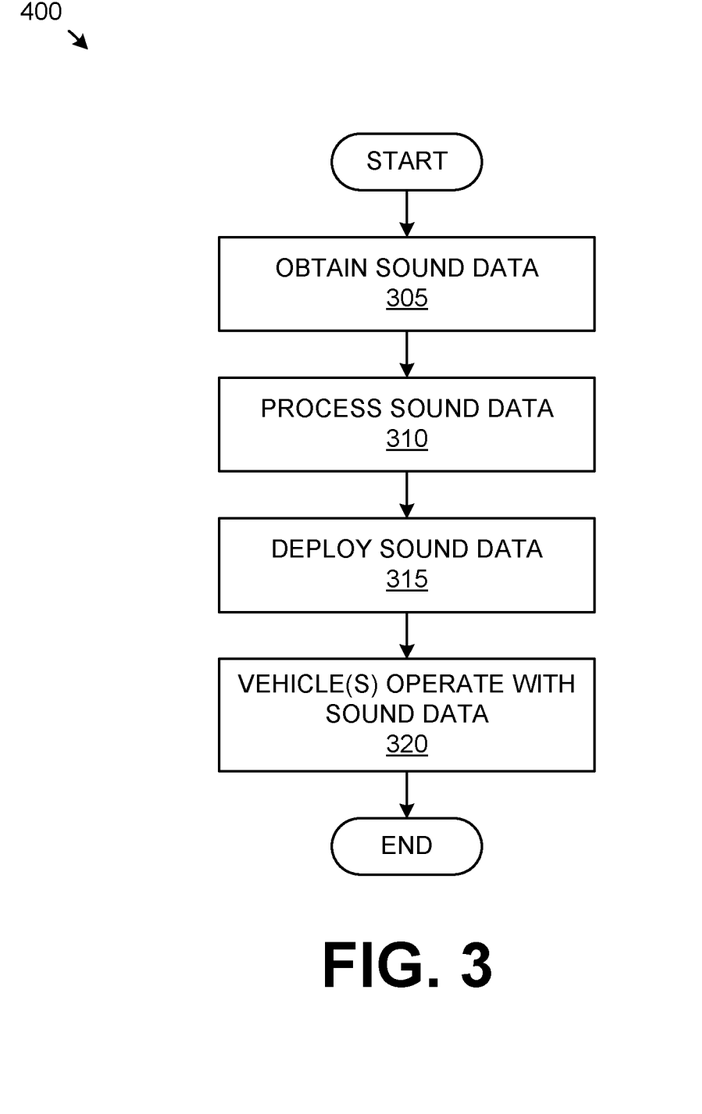
FIG. 3 is a process flow diagram of an example process for obtaining, processing, and deploying a sound recording.

FIG. 3 is a process flow diagram of an example process 300 for obtaining, processing, and deploying a sound recording. The process 300 begins in a block 305, in which a host vehicle obtains a sound recording and uploads the sound recording to a remote server 118, e.g., according to the process 400 described below with respect to FIG. 4.

Next, in a block 310, the server 118 processes the received sound data, as described above.

Next, in a block 315, the server 118 deploys the sound data to one or more vehicles, possibly including the host vehicle 102 described above, but also possibly including other vehicles, e.g., on a similar type as the host vehicle 102.

Then, as indicated in a block 320, the host vehicle 102 and/or other vehicles operate with the sound data received from the remote server 118. For example, a vehicle could include external speakers mounted at one or more locations on the vehicle to output the sound. Vehicles receiving the sound data could then operate using the sound data, e.g., by receiving a user input to utilize the sound data during operation. Moreover, a vehicle computer 104 could cause the sound to be output according to vehicle parameters specifying vehicle operating data, e.g., a segment or segments of a sound file could be played based on a vehicle speed, engine torque, etc., and/or according to timestamps, e.g., sound data could be provided with timestamps where a zero or initial timestamp is a time that the vehicle begins moving, meets a minimum speed threshold, or according to some other suitable criteria.

Following the block 320, the process 300 ends.

Figure 4:
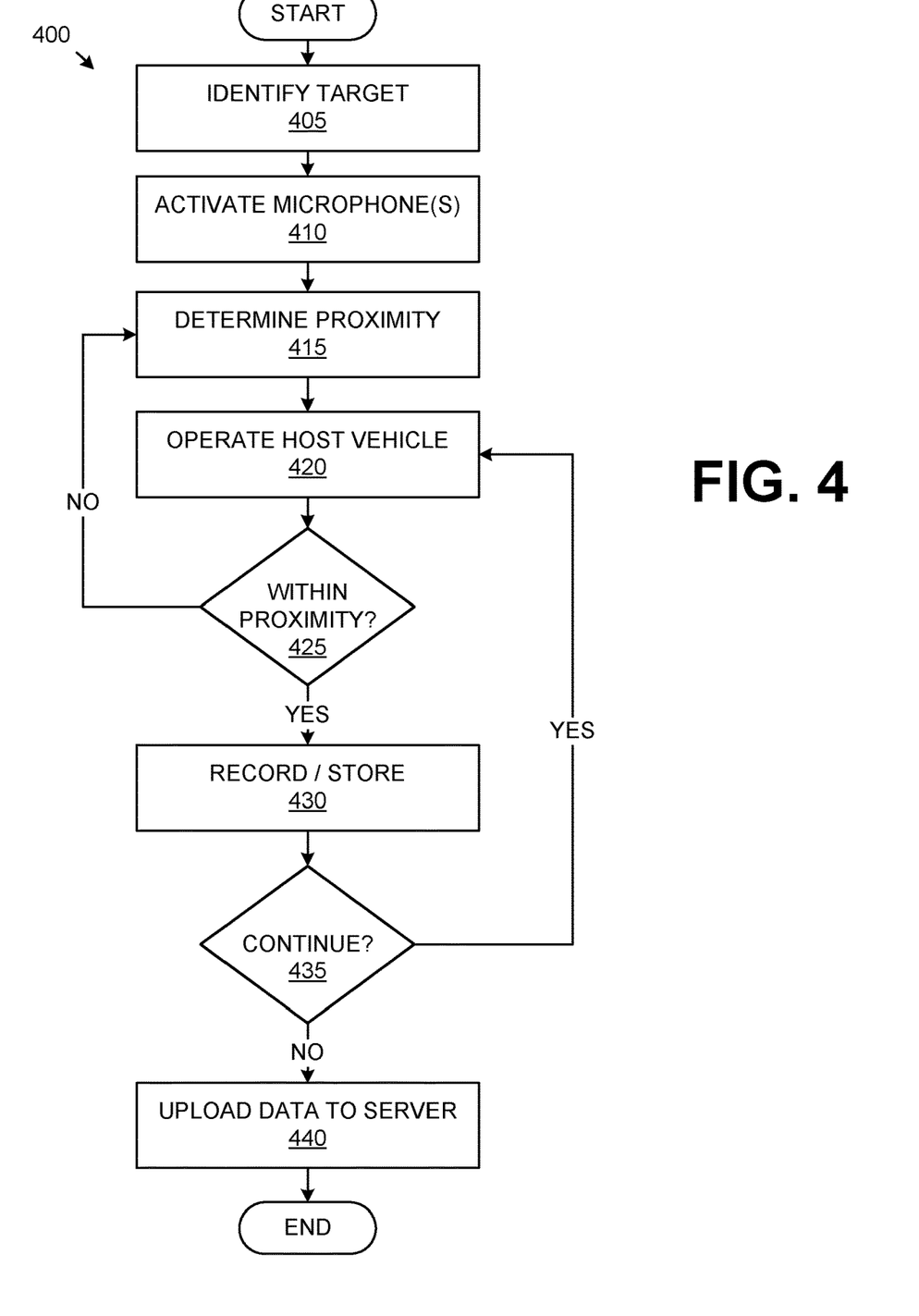
FIG. 4 is a process flow diagram of an example process for operating a host vehicle to obtain a sound recording.

FIG. 4 is a process flow diagram of an example process for operating a host vehicle 102 to obtain a sound recording. The process 400 begins in a block 405, in which a vehicle computer 104 identifies a target vehicle 206 for sound recording, i.e., from user input and/or based on host vehicle sensor 108 data.

Next, in a block 410, the vehicle computer 104 activates one or more host vehicle 102 microphone sensors 108 to record sounds emanating from the target vehicle 206.

Next, in a block 415, the vehicle computer 104 determines a sound recording proximity area 210 for recording sounds from the target vehicle 206. For example, as explained above, the vehicle computer 104 can retrieve stored data indicating the sound recording proximity area 210, i.e., a distance and possibly also a relative position, with respect to the target vehicle 206. As further noted above, the stored data can include values for host vehicle 102 operating data and/or sensor 108 data that specify respective sound recording proximities.

Next, in a block 420, the computer 104 operates the host vehicle 102. As explained above, the computer 104 can utilize driver assist technology such as steering control, adaptive cruise control, etc., to operate the host vehicle 102. The computer 104 is programmed to operate the host vehicle 102 within the specified sound recording proximity area 210 if possible in the block 420. That is, it may not be possible to place and/or maintain the host vehicle 102 within the specified sound recording proximity area 210 of the target vehicle 206 for various reasons. For example, and adaptive cruise control may have a minimum permissible distance between the host vehicle 102 and the target vehicle 206, and the sound recording proximity area 210 may specify a distance less than the minimum permissible distance. In another example, the target vehicle 206 could be operating at a speed and/or acceleration greater than permitted for the host vehicle 102.

Accordingly, after the block 420, the computer 104 determines whether the host vehicle 102 is within the specified sound recording proximity area 210 of the target vehicle 206. If not, the process 400 returns to the block 415. As noted above, specified sound recording proximity area 210 may vary with respect to various factors such as a speed of the target vehicle 206, etc. Therefore, although implementations are possible in which the process 400 returns to the block 420, typically, the process 400 returns to the block 415 to reevaluate the sound recording proximity area 210. Moreover, although not shown in FIG. 4, it is possible that, if the host vehicle 102 does not attain and/or cannot maintain the specified sound recording proximity area 210 within a predetermined time or distance (e.g., five seconds, 100 meters, etc.), then the process or hundred could proceed to a block 435, described below. However, if it is determined in the block 425 that the host vehicle 102 is within the sound recording proximity area 210 of the target vehicle 206, then a block 430 is executed next.

In the block 430, the host vehicle 102 computer 104 records and store sound emanating from the target vehicle 206. Further, as described above, the host vehicle 102 computer 104 may store operating data associated with the recorded sound. The black 435 follows the block 430.

In the block 435, the computer 104 determines whether to continue the process 400. For example, user input initiating the sound recording could have specified a duration of time and/or a distance for the sound recording, the target vehicle 206 could have turned from a roadway 202 to follow a route to different than the host vehicle 102, etc. If the process 400 is to continue, then the process or hundred returns to the block 415 (or to the block 420 if the sound recording proximity area 210 is not to be reevaluated). Otherwise, the process 400 proceeds to a block 440.

In the block 440, the vehicle computer 104 uploads the recorded sound data, and possibly also stored and recorded associated operating data, to the remote server 118. Following the block 440, the process 400 ends.

CONCLUSION

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The adjectives first and second are used throughout this document as identifiers and, unless explicitly stated otherwise, are not intended to signify importance, order, or quantity.

The term exemplary is used herein in the sense of signifying an example, e.g., a reference to an exemplary widget should be read as simply referring to an example of a widget.

Use of in response to, based on, and upon determining herein indicates a causal relationship, not merely a temporal relationship.

Computer executable instructions may be compiled or interpreted from computer programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

The invention claimed is:

1. A system for a host vehicle, comprising a computer that includes a processor and a memory, the memory storing instructions executable by the processor including instructions to:
   identify a target vehicle for sound recording;
   activate a microphone on the host vehicle to record sounds emanating from the target vehicle;
   operate a host vehicle assist feature to maintain a sound recording proximity to the target vehicle; and
   receive the sounds emanating from the target vehicle while the host vehicle is within the sound recording proximity of the target vehicle.

2. The system of claim 1, wherein the instructions to operate the host vehicle assist feature include instructions to operate one or more of propulsion, steering, or braking of the host vehicle.

3. The system of claim 1, wherein the sound recording proximity specifies a distance of the host vehicle from the target vehicle.

4. The system of claim 3, wherein the distance specified by the sound recording proximity is in a range of a maximum distance for the sound recording proximity and a minimum distance for the sound recording proximity.

5. The system of claim 1, wherein the sound recording proximity specifies a position of the host vehicle relative to the target vehicle.

6. The system of claim 1, wherein the instructions further include instructions to adjust the sound recording proximity based on host vehicle sensor data and/or host vehicle operating data.

7. The system of claim 1, wherein the instructions to identify the target vehicle for sound recording include instructions to identify the target vehicle based on a user input.

8. The system of claim 1, wherein the instructions to identify the target vehicle for sound recording include instructions to identify the target vehicle based on host vehicle sensor data.

9. The system of claim 1, wherein the instructions further include instructions to store host vehicle operating data at respective times when the sounds emanating from the target vehicle are recorded, wherein the host vehicle operating data includes at least one of torque demands, accelerations, and speeds, in the host vehicle.

10. The system of claim 1, wherein the instructions include further instructions to upload recorded sounds to a remote server.

11. The system of claim 10, wherein the instructions include further instructions to upload to the remote server host vehicle operating data stored at times associated with the recorded sounds.

12. The system of claim 10, wherein the remote server stores synthetic sounds based on the host vehicle operating data and the recorded sounds.

13. The system of claim 10, wherein the remote server is configured to provide sound data to a third vehicle based on the recorded sounds of the target vehicle received from the host vehicle.

14. The system of claim 13, wherein the remote server is configured to provide operating parameters to the third vehicle along with the sound data based on the recorded sounds of the target vehicle and the host vehicle operating data.

15. A method, comprising:
   identifying a target vehicle for sound recording;
   activating a microphone on a host vehicle to record sounds emanating from the target vehicle;
   operating a host vehicle assist feature to maintain a sound recording proximity to the target vehicle; and
   receiving the sounds emanating from the target vehicle while the host vehicle is within the sound recording proximity of the target vehicle.

16. The method of claim 15, wherein operating the host vehicle assist feature includes operating one or more of propulsion, steering, or braking of the host vehicle.

17. The method of claim 15, wherein the sound recording proximity specifies a distance and/or position of the host vehicle relative to the target vehicle.

18. The method of claim 15, further comprising adjusting the sound recording proximity based on host vehicle sensor data and/or host vehicle operating data.

19. The method of claim 15, further comprising storing host vehicle operating data at respective times when the sounds emanating from the target vehicle are recorded, wherein the host vehicle operating data includes at least one of torque demands, accelerations, and speeds, in the host vehicle.

20. The method of claim 19, further comprising uploading to a remote server host vehicle operating data stored at times associated with the recorded sounds.

\* \* \* \* \*